July 17, 1928.  
L. A. PAINE  
1,677,203  
METER FOR COMBINING THE MEASUREMENT OF DEMAND AND ENERGY  
Filed Feb. 3, 1927

Inventor.  
Louis A. Paine.

Patented July 17, 1928.

1,677,203

UNITED STATES PATENT OFFICE.

LOUIS A. PAINE, OF TORONTO, ONTARIO, CANADA, ASSIGNOR TO THE LINCOLN METER COMPANY LIMITED, OF TORONTO, CANADA

METER FOR COMBINING THE MEASUREMENT OF DEMAND AND ENERGY.

Application filed February 3, 1927. Serial No. 165,630.

The principal objects of the invention are to materially reduce the cost of manufacture of electric meters used for the combined measurement of demand and energy and to materially reduce the size of the instrument.

The principal feature of the invention consists in the novel construction of apparatus whereby a common potential coil is utilized in a combined structure of a differential electric meter and an integrating watt hour meter.

In the accompanying drawings, Figure 1 is an elevational view of the assembled meter structure.

In the construction of certain meters for combining the measurement of demand and energy it has been the practice to combine a differential type of meter and a watt hour meter and according to such practice entirely separate magnetic structures have been used to operate the demand portion and the integrated or kilowatt hour portion, the watt hour meter having its voltage winding energized by the line voltage with its current winding energized by the line current and producing fluxes for its operation within its own magnetic structure and the differential meter voltage winding, including a secondary winding forming a transformer, being used and operated from a separate magnetic structure.

In the diagrammatic illustration furnished herewith the potential coil A is connected across the line B—C. The differential meter shown is the thermal type and the current winding D of the thermal watt meter is preferably wound about the coil A. The ends of this current winding D are connected respectively to one end of each of the thermal meter heaters D' and D''. The other ends of the heaters are connected together to form a closed circuit and the common lead E centrally connected between the heaters is connected to one end of the secondary coil F of a small current transformer.

The current coil G of the integrating watt meter, which is arranged at the opposite side of the rotor H of the integrating watt meter from the coil A. is connected by the lead I to the other end of the transformer coil F and the other end of the coil G is connected by the lead J with the mid-point K of the current coil D.

It will be understood that the coil G is energized by a current proportional to the line current and in conjunction with the rotor H functions as a standard A. C. watt hour meter.

The proportional current from the coil F enters the coil D at the mid point K and combines with the circulating current in the closed circuit through the heaters D' and D'' which is induced by the potential winding A, said current returning to coil F through the lead E. This arrangement produces a current in the heater D' proportional to $(E+\frac{1}{2}I)$ and in the heater D'' proportional to $(E-\frac{1}{2}I)$, where E is the voltage and I is the current. The result produced is the functioning of a thermal A. C. demand meter. It will thus be seen that the potential winding A performs a dual service.

The transformer F is a small accurate three-wire current tarnsformer with a primary winding of capacity for the line current and may be arranged within the meter case with its terminals adjacent to the line wire terminals entering the case and the secondary winding is connected with the current coil G and the current winding D and the thermal meter heaters D' and D'' as described. This obviates the mechanical difficulties of winding a heavy capacity three wire current coil in a three wire single phase circuit upon the potential coil.

Figure 1:
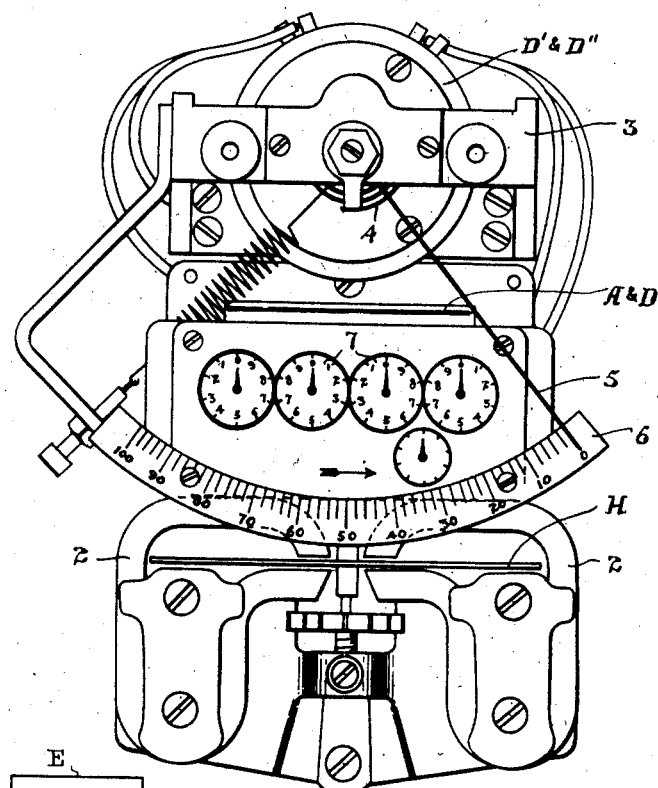
Figures 2, 3:
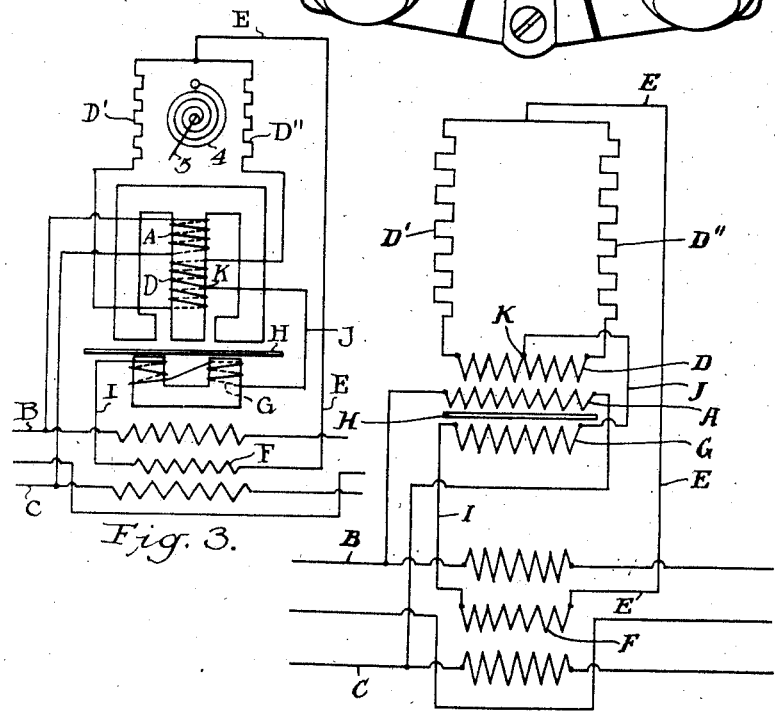
Figure 2 is a diagram of the wiring of the meter.
Figure 3 is a diagram illustrating the arrangement of the magnetic circuit and the thermal indicator element.

In the illustration of the construction in Figure 1 the members 2 represent the permanent magnets of the watt hour meter element. H is the disc, 3 is the frame support of the heaters D', D'', 4 is the thermal element which operates the indicator hand 5 to indicate on the scale 6, and 7 are the watt hour meter indicator dials.

The dual use of the single potential coil as described effects the saving of one coil, consequently there is a considerable saving in the cost of construction and the size of the entire apparatus is materially reduced.

What I claim as my invention is:

1. In a meter for combining the measurement of demand and energy, the combination with the current coils of a differential meter and an integrating watt hour meter, of a potential coil common to both meters.

2. In a meter for combining the measurement of demand and energy, a watt hour meter having a current coil and a potential coil, and a differential meter having a current coil connected with the watt hour meter current coil and wound upon the potential coil of said watt hour meter.

3. In a meter for combining the measurement of demand and energy, a single potential coil, a current transformer, a watt hour meter current coil having one lead connected to said transformer, and a differential meter current coil connected with said watt hour meter current coil and with said transformer and arranged within the zone of influence of said potential coil.

4. In a meter for combining the measurement of demand and energy, a current transformer, a watt hour meter current coil connected at one end with said transformer, a potential coil arranged adjacent to said current coil, a current coil arranged within the zone of influence of said potential coil and connected at its mid point with the aforesaid current coil, a pair of heater elements connected one to each end of the latter current coil and connected together in a closed circuit, and a common lead from said heaters to said transformer.

5. In a meter for combining the measurement of demand and energy, in combination, an integrating meter rotor, a current transformer, a current coil arranged at one side of said rotor and connected at one end to said transformer, a potential coil arranged at the opposite side of said rotor, a current coil wound upon said potential coil and having its mid-point connected with the other end of the aforesaid current coil, differential elements connected one with each end of the current coil centrally connected, said differential elements being connected together in a closed circuit with the centrally connected current coil, and a common lead from said differential elements to said transformer.

LOUIS A. PAINE.